United States Patent
Wen et al.

(10) Patent No.: US 12,475,070 B2
(45) Date of Patent: Nov. 18, 2025

(54) METHOD AND DEVICE FOR TRANSMITTING DATA BASED ON AUTOMOTIVE ETHERNET, AND VEHICLE DEVICE EMPLOYING METHOD

(71) Applicants: Futaijing Precision Electronics (Yantai) Co., Ltd., Yantai (CN); HON HAI PRECISION INDUSTRY CO., LTD., New Taipei (TW)

(72) Inventors: Yung-Chuan Wen, New Taipei (TW); Jian-Kai Zhang, New Taipei (TW); Yuan-Lin Ko, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 25 days.

(21) Appl. No.: 18/413,270

(22) Filed: Jan. 16, 2024

(65) Prior Publication Data
US 2025/0181532 A1      Jun. 5, 2025

(30) Foreign Application Priority Data
Nov. 30, 2023   (CN) .......................... 202311632409.0

(51) Int. Cl.
G06F 13/36      (2006.01)
B60R 16/023     (2006.01)

(52) U.S. Cl.
CPC .......... *G06F 13/36* (2013.01); *B60R 16/0231* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 7,802,263 B2 * | 9/2010 | Fuchs | H04L 43/08 709/213 |
| 11,373,459 B2 * | 6/2022 | Ohmert | G06F 9/541 |
| 11,381,420 B2 * | 7/2022 | Torisaki | H04W 88/16 |
| 12,250,274 B2 * | 3/2025 | Mesde | H04L 69/08 |
| 2015/0003456 A1 * | 1/2015 | Seo | H04L 12/28 370/392 |
| 2019/0141133 A1 * | 5/2019 | Rajan | G06F 13/4282 |
| 2022/0224777 A1 | 7/2022 | Entelis et al. | |
| 2022/0355861 A1 * | 11/2022 | Yamada | B60W 50/10 |

FOREIGN PATENT DOCUMENTS

CN          114697912         7/2022

* cited by examiner

*Primary Examiner* — Elias Mamo
(74) *Attorney, Agent, or Firm* — ScienBiziP, P.C.

(57) ABSTRACT

A data transmission method for transmitting different data with different data format based on vehicle Ethernet includes: receiving a first data sent by a zone device of a vehicle, the zone device comprising a CAN transceiver, a LIN transceiver, or a FlexRay transceiver, detecting an original data format of the first data, determining a first predetermined conversion algorithm matched with the original data format of the first data, and converting the original data format of the first data to an Ethernet data format according to the first predetermined conversion algorithm, and transmitting the first data with the Ethernet data format to a CCU of the vehicle. A data transmission device and a vehicle device are also disclosed.

12 Claims, 9 Drawing Sheets

CAN data format

| ID | RTR | IDE | r | DLC | Data | CRC | DEL | ACK | DEL | EOF |

LIN data format

| Break | Sync | ID | Data | Checksum |

FlexRay data format

| Indicators | Frame ID | Payload Length | Header CRC | Cycle Count | D0 | D1 | CRC |

FIG. 2

METHOD AND DEVICE FOR TRANSMITTING DATA BASED ON AUTOMOTIVE ETHERNET, AND VEHICLE DEVICE EMPLOYING METHOD

TECHNICAL FIELD

The subject matter herein generally relates to data transmissions based on an automotive Ethernet.

BACKGROUND

Bus protocols of current vehicles include a controller area network (CAN) bus, a local interconnect network (LIN) bus, a FlexRay bus (a facto standard of an automotive industry), a low voltage differential signaling (LVDS) bus, a media oriented system transport (MOST) bus, etc.

However, data transmission bandwidths of the bus protocols are limited, and cannot satisfy demands for vehicles to vehicles communication and vehicles to road facilities communication, and the bus protocols also cannot communicate with each other, there is room for improvement.

BRIEF DESCRIPTION OF THE DRAWINGS

Implementations of the present disclosure will now be described, by way of embodiments, with reference to the attached figures.

FIG. 2 is data structure diagrams illustrating a CAN data format, a LIN data format, and a FlexRay data format according to an embodiment of the present disclosure.

DETAILED DESCRIPTION

Figure 1:
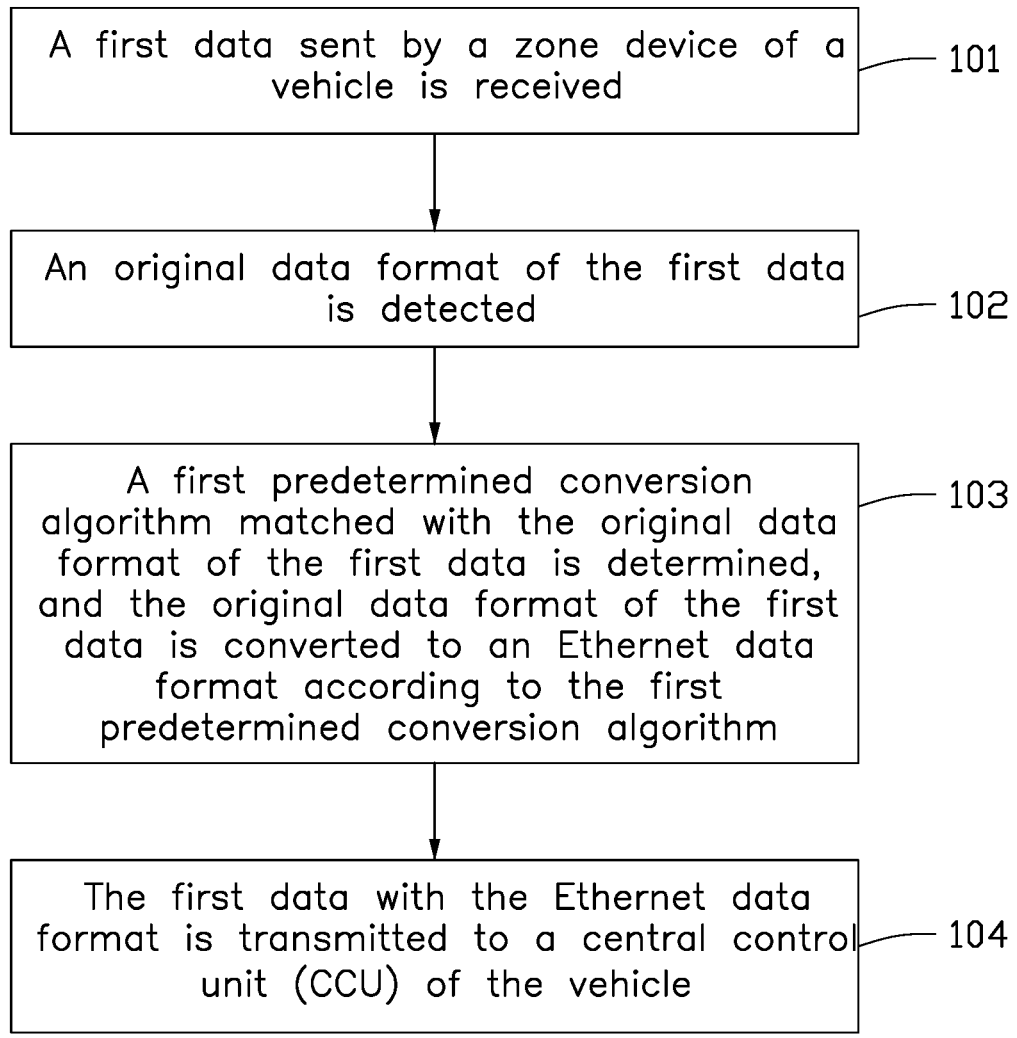
FIG. 1 is a flowchart illustrating a data transmission method according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates one exemplary embodiment of a data transmission method. The data transmission method can be applied to a data transmission device based on an automotive Ethernet. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 101.

In block 101, a first data sent by a zone device of a vehicle is received.

In one embodiment, the zone device can include a controller area network (CAN) transceiver, a local interconnect network (LIN) transceiver, or a FlexRay transceiver, etc.

In one embodiment, the zone device can be an on-board device or a device that implements a specific function of a vehicle. For example, the zone device can be an on-board loudspeaker, an on-board screen, or a dashboard. Different zone devices may use different or the same technology for data transmission.

In block 102, an original data format of the first data is detected.

In one embodiment, before detecting the original data format of the first data, the data transmission device may read a configuration file for describing a plurality of data formats, and obtain format information for characterizing an identity of each of the plurality of data formats. The plurality of data formats can include a CAN data format, a LIN data format, a FlexRay data format, etc. The original data format of the first data is one data format of the plurality of data formats. The data transmission device can further obtain first format information of the first data and determine the original data format matched with the first format information according to the format information of the plurality of data formats.

In one embodiment, the format information for characterizing an identity of each of the plurality of data formats is a data header of each of the plurality of data formats. That is, a data header of a data can be configured to characterize an identity of the data.

In one embodiment, different data with the same data formats have the same data headers, and a data format of a data can be determined by comparing data header. The data transmission device can obtain data headers of the plurality of data formats, to learn data headers of different data formats. The data transmission device can further obtain a first data header of the first data, and determine the original data format matched with the first data header according to the data headers of the plurality of data formats. For example, the original data format of the first data can be determined by comparing the first data header of the first data with each of the data headers of the plurality of data formats.

Referring to FIG. 2, the CAN data format, the LIN data format, and the FlexRay data format are shown. As shown in FIG. 2, different data formats have different data headers.

In block 103, a first predetermined conversion algorithm matched with the original data format of the first data is determined, and the original data format of the first data is converted to an Ethernet data format according to the first predetermined conversion algorithm.

In one embodiment, different data formats may correspond to different conversion algorithms. The conversion algorithm correspond to each of the plurality of data formats can be preset or defined.

In block 104, the first data with the Ethernet data format is transmitted to a central control unit (CCU) of the vehicle.

Figure 3:
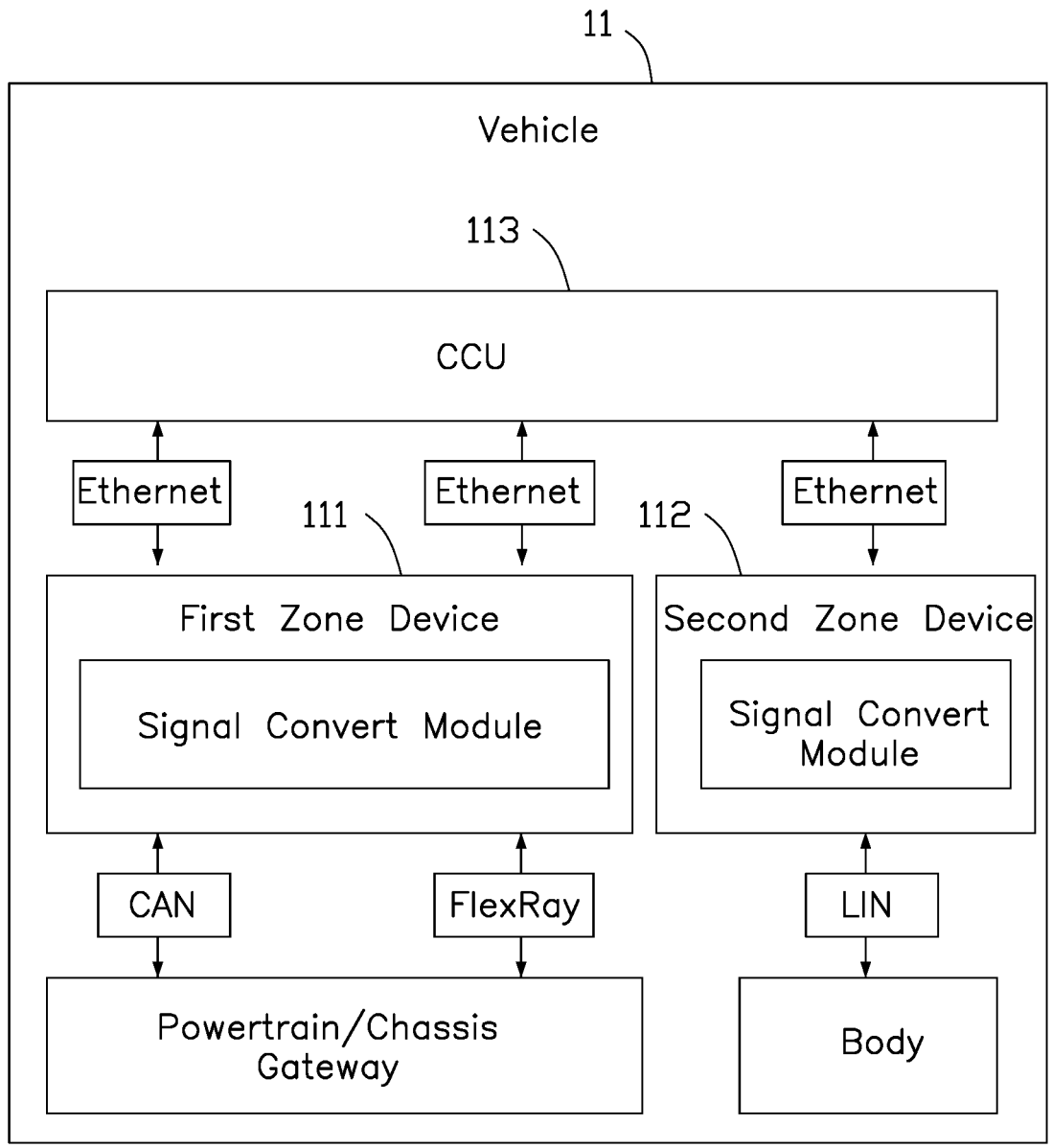
FIG. 3 is a scenario diagram illustrating a data transmission process in a vehicle according to an embodiment of the present disclosure.

Referring to FIG. 3, the vehicle 11 may include a plurality of zone devices. FIG. 3 shows a first zone device 111 and a second zone device 112 as an example. Each of the plurality of zone devices may include a signal convert module, the signal convert module can convert data with different data formats to the Ethernet data format. The signal convert module can be a data format converter.

In one embodiment, the data transmission device can be integrated into the zone device. The signal convert module can be defined as the data transmission device.

For example, the first zone device 111 may communicate with the CCU 113 based on an Ethernet bus, and the first zone device 111 is configured to control a powertrain and a chassis gateway of the vehicle 11. The powertrain may communicate with the first zone device 111 based on an CAN bus, and the chassis gateway may communicate with the first zone device 111 based on an FlexRay bus.

For example, the second zone device 112 may communicate with the CCU 113 based on the Ethernet bus, and the second zone device 112 is configured to control a body (the body may include windows, rearview mirrors, air conditioner, lamps, wipers, etc.) of the vehicle 11. The body of the vehicle 11 may communicate with the second zone device 112 based on an LIN bus.

For example, the powertrain needs to transmit a first data to the CCU 113. The powertrain may transmit the first data to the first zone device 111 based on the CAN bus, and an original data format of the first data is the CAN data format. The signal convert module of the first zone device 111 can convert the original data format of the first data to the Ethernet data format, and the first zone device 111 can transmit the first data with the Ethernet data format to the CCU 113.

The data transmission method can realize a protocol conversion between different buses. For example, data with different data formats are converted into the Ethernet data format to transmit to the CCU, so that different data formats can be transmitted on an electrical architecture of the vehicle Ethernet as a backbone, and the vehicle Ethernet has a specific high bandwidth and low latency characteristics, data transmission speeds can be made faster and faster, and delay and jitter times can be decreased, coupled with an information security mechanism of the vehicle Ethernet, it can ensure that important signals can be transmitted to the destination completely and safely. In addition, data with different data formats also represent a variety of transmission interfaces, a hardware cost is high, and a software complexity is also greatly increased, by transmitting data with different data formats on the Ethernet, the cost of software and hardware can be reduced, and weight and complexity of wiring harnesses can be reduced, so as to save a development process and a development time.

Figure 4:
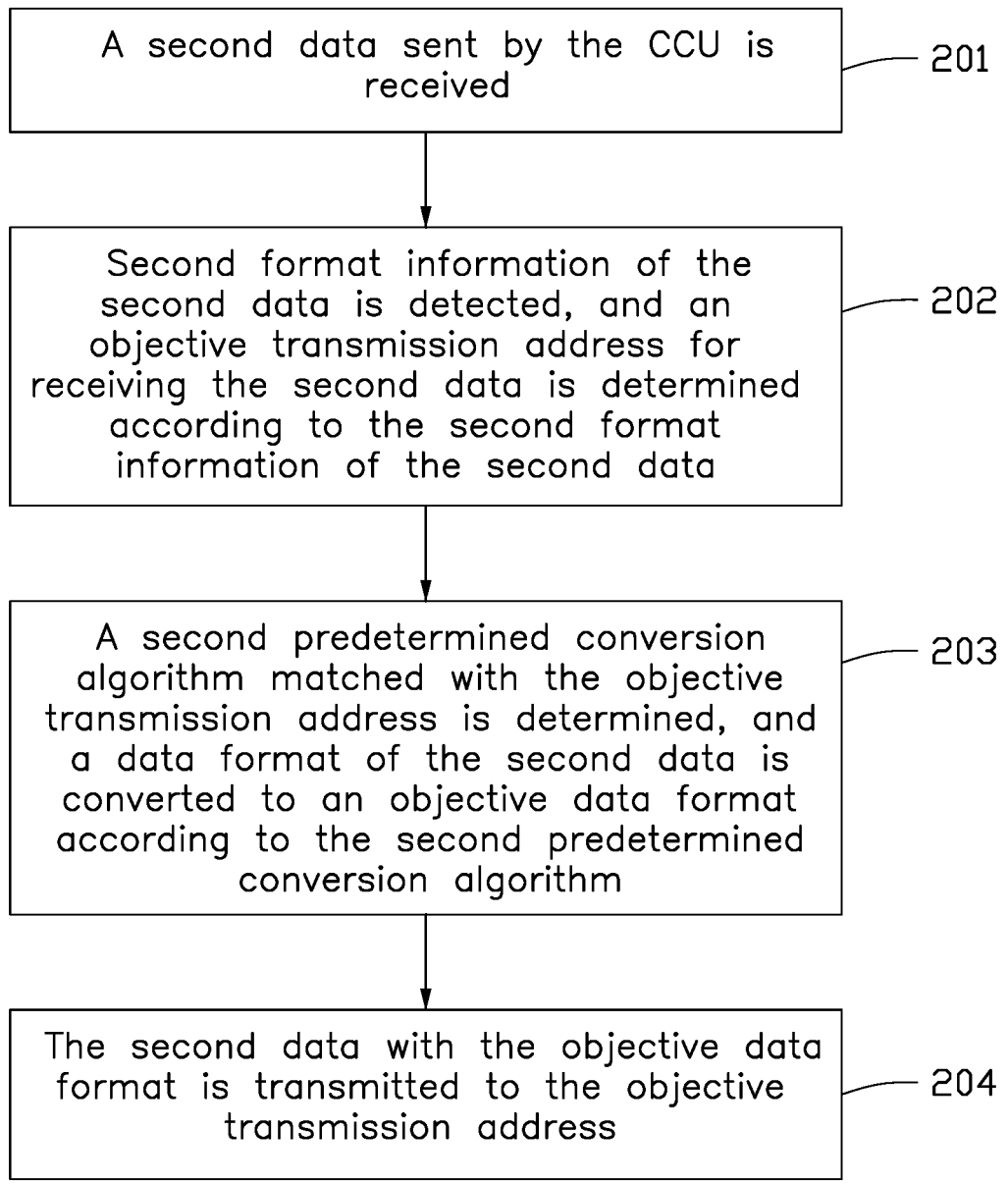
FIG. 4 is a flowchart illustrating a data transmission method according to another embodiment of the present disclosure.

FIG. 4 illustrates one exemplary embodiment of a data transmission method. The data transmission method can be applied to a data transmission device based on an automotive Ethernet. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 201.

In one embodiment, the CCU may transmit data to the zone device (i.e. an objective transmission address). The data transmission device can convert a data format of the data into an objective data format matched with the zone device. For example, a data transmitted by the CCU is the Ethernet data format, the data transmission device can convert the Ethernet data format to the CAN data format, the LIN data format, or the FlexRay data format. In this way, different data with different data formats can be transmitted on the architecture of Ethernet, and the cost of data transmission can be reduced.

In block 201, a second data sent by the CCU is received.

For example, when the CCU need to transmit the second data to one zone device, the data transmission device can receive the second data.

In block 202, second format information of the second data is detected, and an objective transmission address for receiving the second data is determined according to the second format information of the second data.

In one embodiment, the objective transmission address can be a CAN transceiver, a LIN transceiver, or a FlexRay transceiver of a zone device, or the objective transmission address can be a unique identification of a zone device.

In one embodiment, the second data may include an IP and a port number of the objective transmission address. The data transmission device can detect an IP and a port number recorded in the second data, and determine the objective transmission address for receiving the second data according to the IP and the port number recorded in the second data.

In one embodiment, the configuration file may store communication protocol of the objective transmission address, and record corresponding socket port number. The data transmission device can obtain the IP and port number of the objective transmission address by reading the configuration file, so as to fill the IP and port number into the second data.

In block 203, a second predetermined conversion algorithm matched with the objective transmission address is determined, and a data format of the second data is converted to an objective data format according to the second predetermined conversion algorithm.

In one embodiment, the data transmission device can determine the second predetermined conversion algorithm matched with the objective transmission address, and convert the data format of the second data to the objective data format. For example, the data transmission device can convert an Ethernet data format of the second data to the CAN data format.

In one embodiment, the data transmission device can write an envelope format matched with the objective transmission address to the second data according to the second predetermined conversion algorithm, to convert the data format of the second data to the objective data format.

Figure 5:
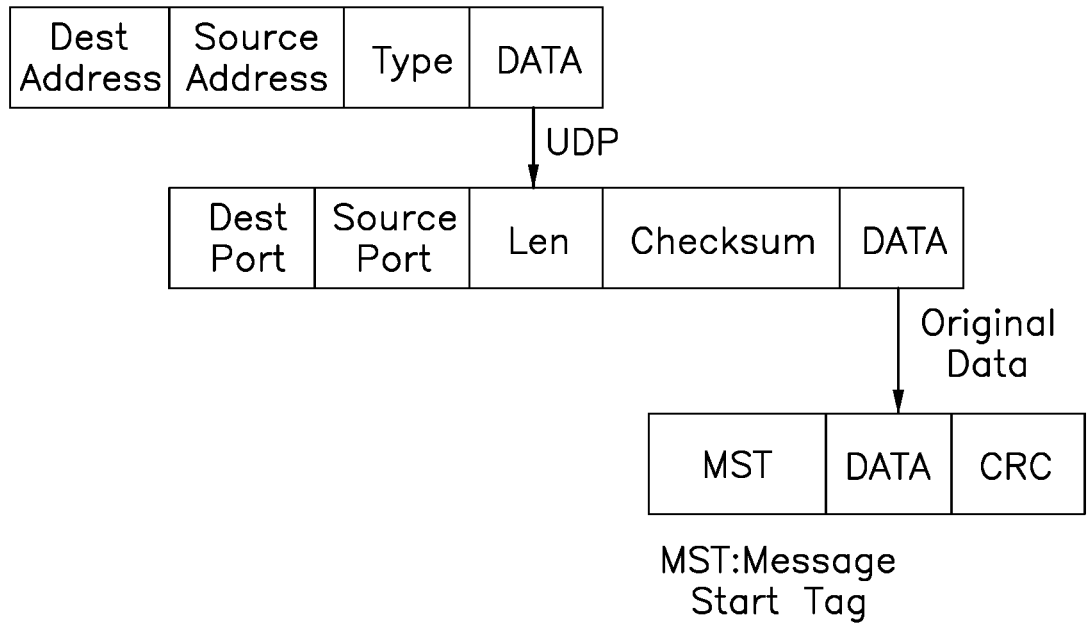
FIG. 5 is a packet diagram illustrating an Ethernet data format according to an embodiment of the present disclosure.
Figure 6:
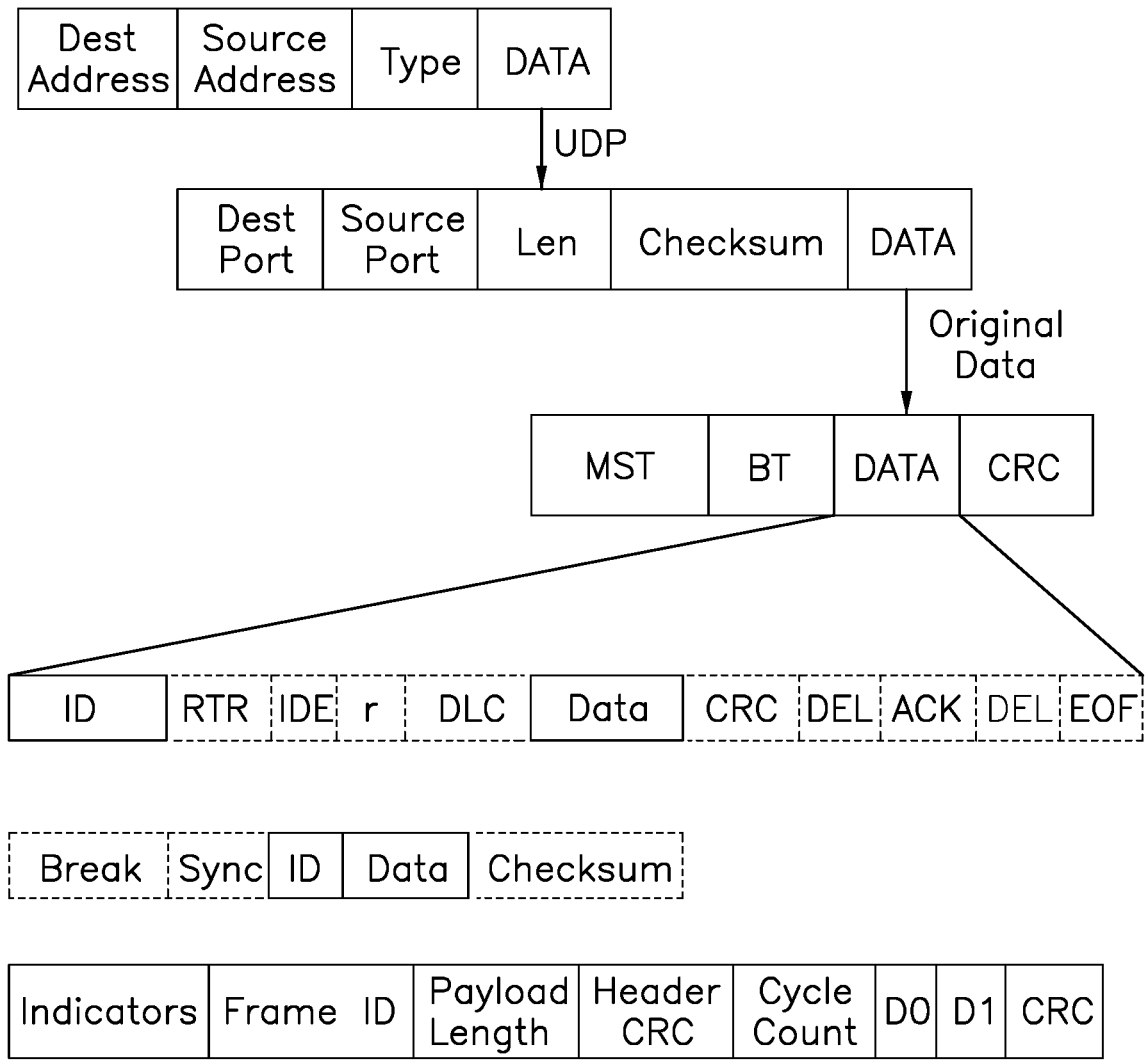
FIG. 6 is packet diagrams illustrating the Ethernet data format being converted to the CAN data format, the LIN data format, or the FlexRay data format according to an embodiment of the present disclosure.

In one embodiment, referring to FIGS. 5 and 6, illustrate one exemplary embodiment of converting the data format of the second data to the objective data format. FIG. 5 illustrates a packet of the Ethernet data format, and FIG. 6 illustrates packers of objective data formats (the CAN data format, the LIN data format, and the FlexRay data format).

Referring to FIG. 5, In a user datagram protocol (UDP), "DATA" byte stores information that needs to be stored of an original protocol, such as identity document (ID) information, data information, etc. In the "DATA" byte of the UDP, in order to identify the starting position of the data, the previous byte of the "DATA" byte is used to separate the data of the original format by using a message start tag (MST), and then put the content of the original format into the "DATA" byte.

Referring to FIG. 6, the packet of the Ethernet data format can be convert to a packet of the CAN data format, or a packet of the LIN data format, or a packet of the FlexRay data format.

In block 204, the second data with the objective data format is transmitted to the objective transmission address.

Figure 7:
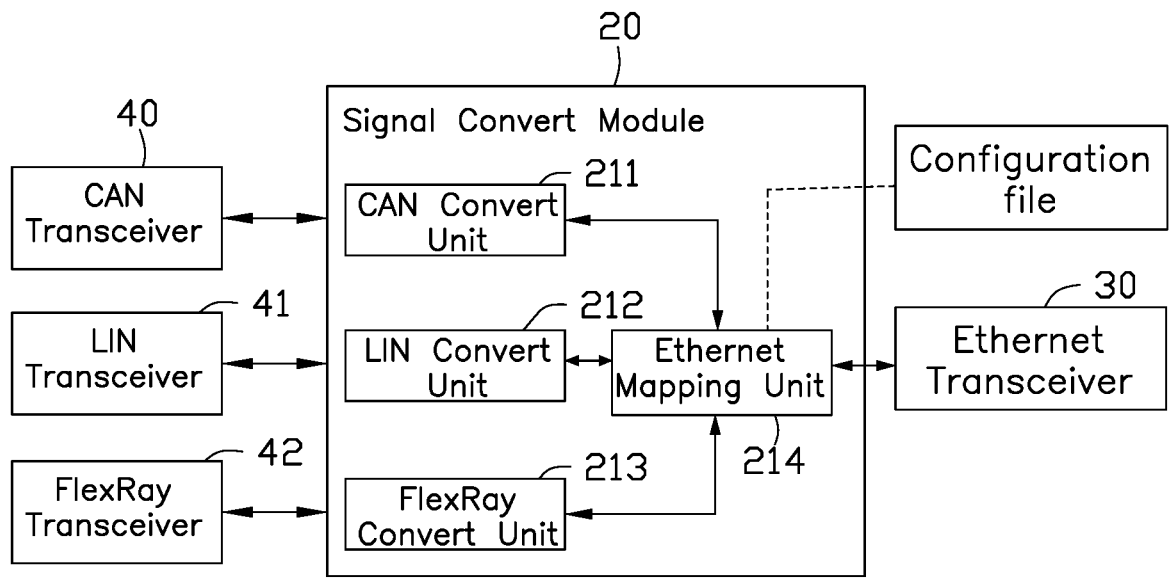
FIG. 7 is a block diagram illustrating data conversion and transmission according to an embodiment of the present disclosure.

FIG. 7 shows one exemplary embodiment of transmitting the second data with the objective data format to the objective transmission address.

Referring to FIG. 7, the signal convert module 20 may include a CAN convert unit 211, a LIN convert unit 212, a FlexRay convert unit 213, and an Ethernet mapping unit 214. An Ethernet transceiver 30 may transmit the second data to the Ethernet mapping unit 214, and the Ethernet mapping unit 214 can determine the objective transmission address corresponding to the second data. FIG. 7 shows three objective transmission addresses: the CAN transceiver 40, the LIN transceiver 41, and the FlexRay transceiver 42.

For example, the objective transmission address corresponding to the second data is the CAN transceiver 40, the Ethernet mapping unit 214 can convert the data format of the second data from the Ethernet data format to the CAN data format, and transmit the second data with the CAN data format to the CAN transceiver 40 via the CAN convert unit 211.

In one embodiment, when the Ethernet mapping unit 214 determines that the objective transmission address corresponding to the second data is the CAN transceiver 40, the Ethernet mapping unit 214 can transmit the second data to the CAN convert unit 211, the CAN convert unit 211 can convert the data format of the second data from the Ethernet data format to the CAN data format, and transmit the second data with the CAN data format to the CAN transceiver 40.

In one embodiment, the CAN transceiver 40 may transmit the first data to the CAN convert unit 211, the CAN convert unit 211 can convert the data format of the first data from the CAN data format to the Ethernet data format. Furthermore, the CAN convert unit 211 can transmit the first data with the Ethernet data format to the Ethernet transceiver 30 of the CCU via the Ethernet mapping unit 214.

In one embodiment, before the data transmission device performs block 201, the data transmission device may further perform blocks 101~104.

Figure 8:
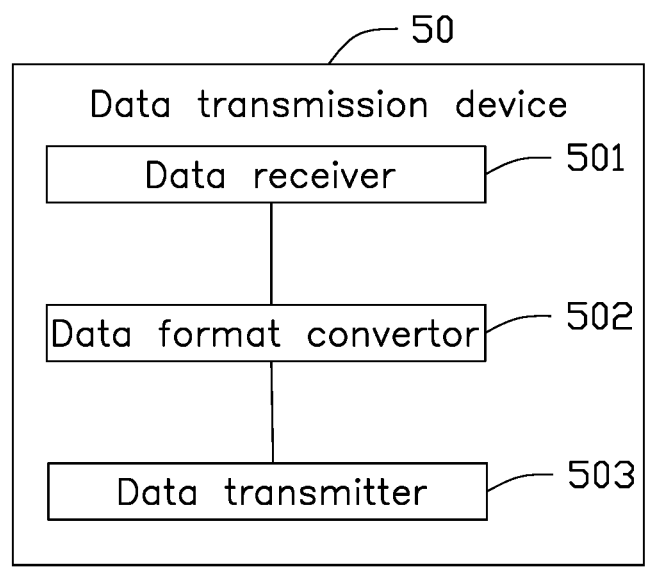
FIG. 8 is a block diagram illustrating a data transmission device according to an embodiment of the present disclosure

Referring to FIG. 8, the data transmission device 50 may include a data receiver 501, a data format convertor 502, and a data transmitter 503. The data receiver 501 is configured to receive a first data sent by a zone device of a vehicle, the zone device may include a CAN transceiver, a LIN transceiver, or a FlexRay transceiver. The data format convertor 502 is configured to detect an original data format of the first data, determine a first predetermined conversion algorithm matched with the original data format of the first data, and convert the original data format of the first data to an Ethernet data format according to the first predetermined conversion algorithm. The data transmitter 503 is configured to transmit the first data with the Ethernet data format to a CCU of the vehicle.

In one embodiment, the data receiver 501 is further configured to receive a second data sent by the CCU. The data format convertor 502 is further configured to detect second format information of the second data, and determine an objective transmission address for receiving the second data according to the second format information of the second data. The objective transmission address is a CAN transceiver, a LIN transceiver, or a FlexRay transceiver of a zone device. The data format convertor 502 is further configured to determine a second predetermined conversion algorithm matched with the objective transmission address, and convert a data format of the second data to an objective data format according to the second predetermined conversion algorithm. The data transmitter 503 is further configured to transmit the second data with the objective data format to the objective transmission address.

Figure 9:
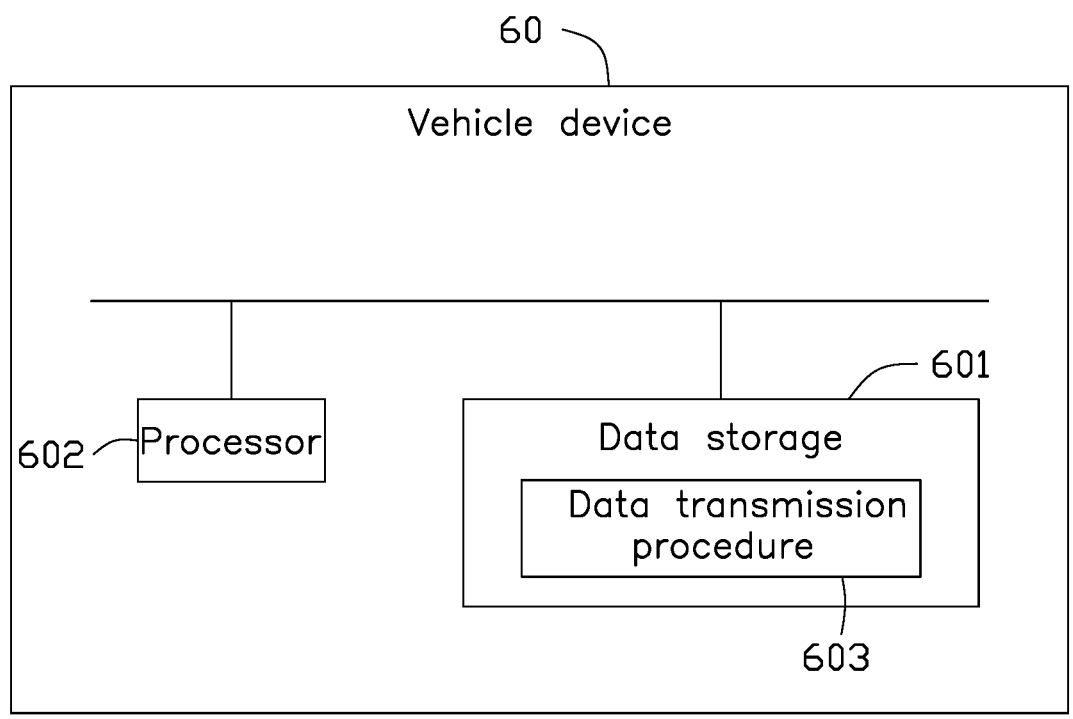
FIG. 9 is a block diagram illustrating a vehicle device according to an embodiment of the present disclosure.

Referring to FIG. 9, a vehicle device 60 may include at least one data storage 601, at least one processor 602, and a data transmission procedure 603. The vehicle device 60 can be set in the vehicle 11.

In one embodiment, the data storage 601 can be set in the vehicle device 60, or can be a separate external memory card, such as an SM card (Smart Media Card), an SD card (Secure Digital Card), or the like. The data storage 601 can include various types of non-transitory computer-readable storage mediums. For example, the data storage 601 can be an internal storage system, such as a flash memory, a random access memory (RAM) for the temporary storage of information, and/or a read-only memory (ROM) for permanent storage of information. The data storage 601 can also be an external storage system, such as a hard disk, a storage card, or a data storage medium. The processor 602 can be a central processing unit (CPU), a microprocessor, or other data processor chip that achieves the required functions.

In one embodiment, the data transmission procedure 603 may include one or more software programs in the form of computerized codes stored in the data storage 601. The computerized codes can include instructions that can be executed by the processor 602 to implement the above-mentioned of data transmission method.

In other embodiments, comparing with FIG. 9, the vehicle device 60 can include more or less elements, for example, the vehicle device 60 can further include communication elements, buses elements.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A data transmission method, comprising:
   receiving a first data sent by a zone device of a vehicle, wherein the zone device comprises a controller area network (CAN) transceiver, a local interconnect network (LIN) transceiver, or a FlexRay transceiver;
   detecting an original data format of the first data;
   determining a first predetermined conversion algorithm matched with the original data format of the first data, and converting the original data format of the first data to an Ethernet data format according to the first predetermined conversion algorithm;
   transmitting the first data with the Ethernet data format to a central control unit (CCU) of the vehicle;
   receiving a second data sent by the CCU;
   detecting second format information of the second data and determining an objective transmission address for receiving the second data according to the second format information of the second dat;
   determining a second predetermined conversion algorithm matched with the objective transmission address;
   writing an envelope format matched with the objective transmission address to the second data according to the second predetermined conversion algorithm, to convert a data format of the second data to an objective data format; and
   transmitting the second data with the objective data format to the objective transmission address.

2. The data transmission method of claim 1, wherein before detecting the original data format of the first data, the method further comprises:
   reading a configuration file for describing data formats and obtaining format information for characterizing identities of the data formats, wherein the data formats comprise a CAN data format, a LIN data format, and a FlexRay data format, and the original data format of the first data is one data format of the data formats;
   detecting the original data format of the first data further comprises:
   obtaining first format information of the first data and determining the original data format matched with the first format information according to the format information for characterizing identities of the data formats.

3. The data transmission method of claim 2, wherein obtaining the format information for characterizing the identities of the data formats further comprises:
   obtaining a data header of each of the data formats;
   obtaining the first format information of the first data further comprises:
   obtaining a first data header of the first data;
   determining the original data format matched with the first format information according to the format information for characterizing identities of the data formats further comprises:
   determining the original data format matched with the first data header according to data headers of the data formats.

4. The data transmission method of claim 1, wherein the objective transmission address is a CAN transceiver, a LIN transceiver, or a FlexRay transceiver of a zone device.

5. The data transmission method of claim 4, wherein the second data comprises an internet protocol (IP) and a port number of the objective transmission address, detecting the second format information of the second data and determining the objective transmission address for receiving the second data according to the second format information of the second data further comprises:
   detecting an IP and a port number recorded in the second data; and
   determining the objective transmission address for receiving the second data according to the IP and the port number recorded in the second data.

6. A data transmission device, comprising:
   a data receiver, configured to receive a first data sent by a zone device of a vehicle, wherein the zone device comprises a controller area network (CAN) transceiver, a local interconnect network (LIN) transceiver, or a FlexRay transceiver;
   a data format convertor, configured to detect an original data format of the first data, determine a first predetermined conversion algorithm matched with the original data format of the first data, and convert the original data format of the first data to an Ethernet data format according to the first predetermined conversion algorithm; and
   a data transmitter, configured to transmit the first data with the Ethernet data format to a central control unit (CCU) of the vehicle;
   wherein the data receiver is further configured to receive a second data sent by the CCU;
   the data format convertor is further configured to detect second format information of the second data, and determine an objective transmission address for receiving the second data according to the second format information of the second data, wherein the objective transmission address is a CAN transceiver, a LIN transceiver, or a FlexRay transceiver of a zone device;
   the data format convertor is further configured to determine a second predetermined conversion algorithm matched with the objective transmission address, and write an envelope format matched with the objective transmission address to the second data according to the second predetermined conversion algorithm, to convert a data format of the second data to an objective data format; and
   the data transmitter is further configured to transmit the second data with the objective data format to the objective transmission address.

7. The data transmission device of claim 6, wherein the objective transmission address is a CAN transceiver, a LIN transceiver, or a FlexRay transceiver of a zone device.

8. A vehicle device comprising:
   at least one processor; and
   a data storage storing one or more programs which when executed by the at least one processor, cause the at least one processor to:
     receive a first data sent by a zone device of a vehicle, wherein the zone device comprises a controller area network (CAN) transceiver, a local interconnect network (LIN) transceiver, or a FlexRay transceiver;
     detect an original data format of the first data;
     determine a first predetermined conversion algorithm matched with the original data format of the first data, and convert the original data format of the first data to an Ethernet data format according to the first predetermined conversion algorithm;
     transmit the first data with the Ethernet data format to a central control unit (CCU) of the vehicle;

receive a second data sent by the CCU;
detect second format information of the second data and determine an objective transmission address for receiving the second data according to the second format information of the second dat;
determine a second predetermined conversion algorithm matched with the objective transmission address;
write an envelope format matched with the objective transmission address to the second data according to the second predetermined conversion algorithm, to convert a data format of the second data to an objective data format; and
transmit the second data with the objective data format to the objective transmission address.

9. The vehicle device of claim 8, wherein before the at least one processor detects the original data format of the first data, the at least one processor is further caused to:
read a configuration file for describing data formats and obtain format information for characterizing identities of the data formats, wherein the data formats comprise a CAN data format, a LIN data format, and a FlexRay data format, and the original data format is one data format of the data formats;
wherein when the at least one processor detects the original data format of the first data, the at least one processor is further caused to:
obtain first format information of the first data and determine the original data format matched with the first format information according to the format information for characterizing identities of the data formats.

10. The vehicle device of claim 9, wherein when the at least one processor obtains the format information for characterizing the identities of the data formats, the at least one processor is further caused to:
obtain a data header of each of the data formats;
wherein when the at least one processor obtains the first format information of the first data, the at least one processor is further caused to:
obtain a first data header of the first data;
wherein when the at least one processor determines the original data format matched with the first format information according to the format information for characterizing identities of the data formats, the at least one processor is further caused to:
determine the original data format matched with the first data header according to data headers of the data formats.

11. The vehicle device of claim 8, wherein
the objective transmission address is a CAN transceiver, a LIN transceiver, or a FlexRay transceiver of a zone device.

12. The vehicle device of claim 11, wherein the second data comprises an internet protocol (IP) and a port number of the objective transmission address, when the at least one processor detects the second format information of the second data and determines the objective transmission address for receiving the second data according to the second format information of the second data, the at least one processor is further caused to:
detect an IP and a port number recorded in the second data; and
determine the objective transmission address for receiving the second data according to the IP and the port number recorded in the second data.

* * * * *